April 24, 1962 C. E. HENDEL ETAL 3,031,314
PREPARATION OF DEHYDRATED POTATOES
Filed March 16, 1960 3 Sheets-Sheet 1
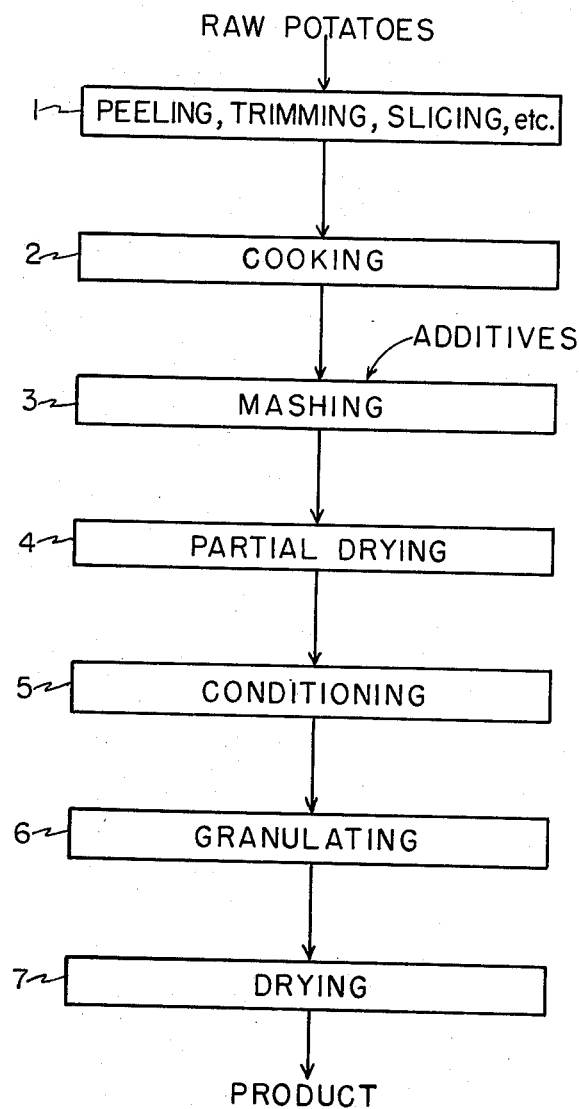
FIG. I
C.E. HENDEL, G.K. NOTTER
& R.M. REEVE.
INVENTORS
BY R. Hoffman,
Attorney

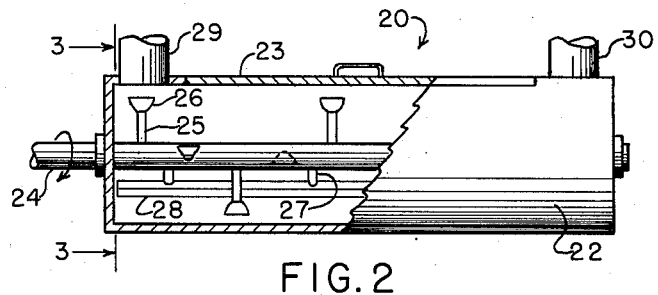
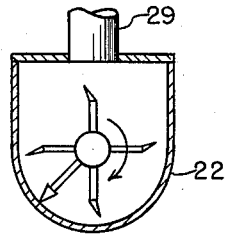
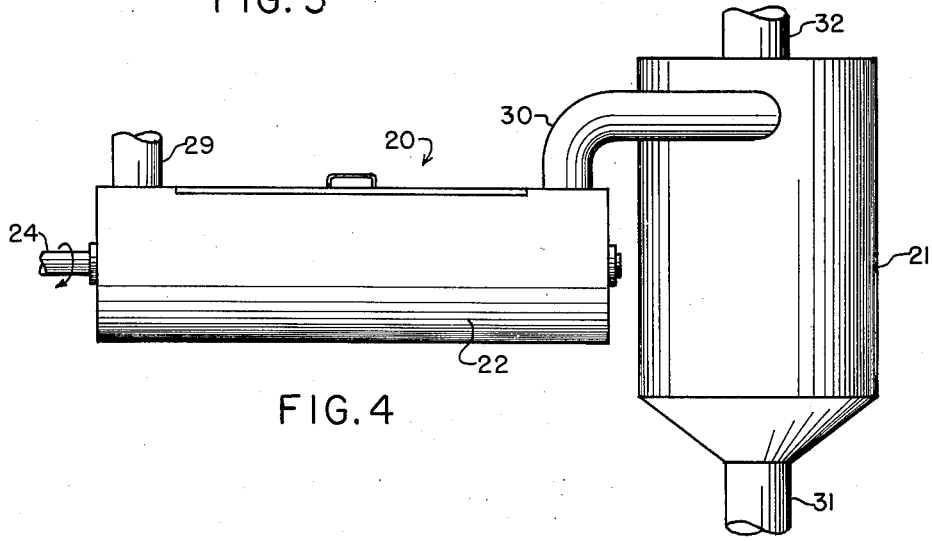

C.E. HENDEL, G.K. NOTTER
& R.M. REEVE.
INVENTORS

3,031,314
PREPARATION OF DEHYDRATED POTATOES
Carl E. Hendel, George K. Notter, and Roger M. Reeve, Berkeley, Calif., assignors to the United States of America as represented by the Secretary of Agriculture
Filed Mar. 16, 1960, Ser. No. 15,508
4 Claims. (Cl. 99—207)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for preparing dehydrated potatoes. A particular object of the invention concerns the provision of improvements in the cooking stage of the process whereby to facilitate subsequent steps and to obtain products of new and improved properties. Further objects and advantages of the invention will be evident from the following description taken in connection with the annexed drawing. Parts and percentages set forth herein are by weight unless otherwise specified.

Figure 6:
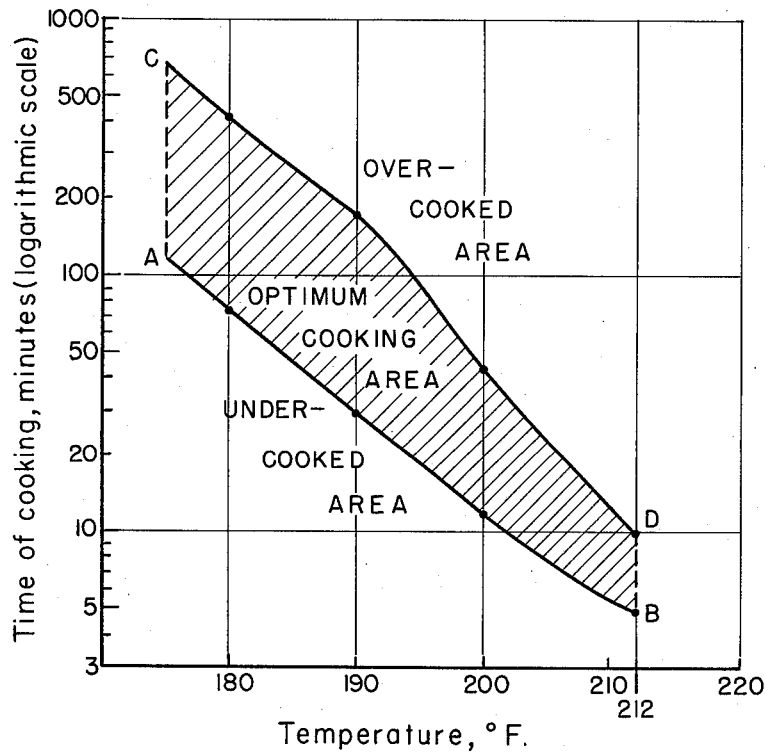
Figure 5:
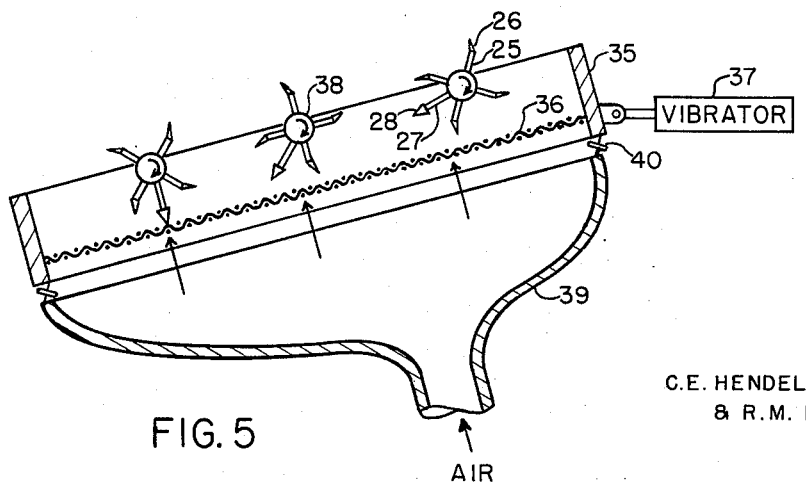

In the drawing, FIG. 1 is a schematic flow-sheet illustrating procedures embodying the principles of the invention. FIG. 2 is a view, partly in cross-section, of a granulator device useful for carrying out various steps in the process, including conditioning and drying as well as granulation. FIG. 3 is a cross-sectional end view taken on plane 3—3 of FIG. 2. FIG. 4 illustrates the granulator used in conjunction with a collecter for receiving dried product. FIG. 5 illustrates another form of apparatus for conditioning, granulating, drying, etc. FIG. 6 is a graph illustrating the temperature and time conditions in the cooking stage.

In the preparation of dehydrated potato products, it is conventional to cook the raw potatoes at an early stage in the process. For example, cooking is applied in preparing all the dried products which are intended to be table-ready on reconstitution of the dried product. Notable among such products are dried potato flakes and dried potato granules. The latter terms are conventionally employed as designating dehydrated, pre-cooked potatoes in flake and granular form, respectively. The cooking procedure presently employed in preparation of the various products is essentially the same as ordinary home-cooking methods. That is, the raw potatoes in the form of slabs or thick slices (about ¾" thick) are boiled in water until tender. Sometimes steam, instead of boiling water, is applied to the potato pieces. In either case, the cooking is continued for about 20 to 30 minutes. The cooked potatoes while hot are then mashed and eventually dried in particulate form. Various specialized steps are employed depending on the type of product to be produced. For example, in preparing dried potato granules by the widely-used "add-back" method, the mashed potatoes are mixed with sufficient dried potatoes from a previous batch to give a moisture content of about 32 to 35% for the composite material. This material is then cooled and conditioned by holding it at about 60 to 80° F. for an hour or more. The conditioned composite material is then dehydrated in a pneumatic drier to produce the dried granules.

Heretofore it has not been recognized that the method of cooking has a profound effect on the properties of the dehydrated product nor on the various procedural steps leading to the product. In accordance with the invention, the cooking is conducted under special conditions—described hereinafter—whereby many significant advantages are obtained, including the following:

Potatoes cooked in accordance with the invention are less sticky than those cooked by conventional methods. As a consequence, subsequent procedures are simplified. For example, the cooked potatoes can be granulated more readily. That is, they can be readily subdivided into fine particles without cell rupture. Also, potatoes cooked in accordance with the invention require less time of conditioning to put them in a granulable state as compared with potatoes cooked by present methods.

The cooking technique of the invention results in uniform cooking throughout the potato pieces with resulting uniformity of the dehydrated product eventually produced. With conventional cooking methods, surface layers tend to be over-cooked while inner portions tend to be under-cooked. Such effects leads to graininess of some portions of the product and stickiness of other portions when the product is reconstituted.

The cooking process of the invention yields products which may be reconstituted with boiling water to produce mashed potatoes of a desirable mealy texture, free from pastiness or graininess.

Moreover, the products of the invention may be reconstituted with water at room temperature. This method of reconstitution is of special advantage where the dried product is formed into mashed potatoes for freezing preservation, for example, in putting up frozen, ready-cooked dinners which merely require heating to make them ready for the table. In producing these ready-cooked dinners, it is highly desirable to use room-temperature water for reconstitution to eliminate need for cooling prior to freezing.

Another point is that the products of the invention will absorb more water than products made with conventional cooking procedures. As a result, the products of the invention will provide a greater amount of reconstituted mashed potatoes as compared with an equal weight of conventional products.

The objects of the invention are attained by cooking the potatoes under controlled conditions. The conditions of cooking have been found to be critical and the improved results of the invention are attained by a correlation of time and temperature. The inter-dependence of these variables is best explained by reference to FIG. 6 in the annexed drawing. In this figure, the minimum and maximum cooking times corresponding to different cooking temperatures are plotted with the temperature on a linear scale and the time on a logarithmic scale. Curve AB represents the minimum cooking conditions while curve CD represents the maximum cooking conditions. Thus, for example, if a cooking temperature of 180° F. is chosen, the potatoes are cooked from 75 to 420 minutes. Other conditions which may be used are, by way of example: At 190° F., 30 to 180 minutes; at 200° F., 12 to 45 minutes; at 212° F., 5 to 10 minutes. By operating within the area ABDC, many significant advantages are gained. Most important is that the potatoes are properly cooked yet the final dried products are not sticky on reconstitution. Moreover, operations subsequent to the cooking step are simplified and take less time. For example, in the manufacture of granules, conditioning under identical conditions will require one-half or less time than potatoes cooked by conventional methods. Also, the potato material can be readily subdivided without cell damage, thus to produce products free from stickiness on reconstitution. Other advantages have been mentioned above or are discussed below in connection with operating outside of the preferred range.

Our researches have shown that where the cooking is carried out under conditions falling below curve AB, inferior results are attained. Under such condtions, there are many uncooked particles and when the potato material is treated in subsequent steps, so much mechanical force must be applied to subdivide these particles that extensive cell rupture occurs. As a result, the final dried product on reconstitution forms a mass of undesirable pasty texture. Also, if the cooking is carried out under conditions falling above curve CD inferior results are obtained, these involving either (a) discoloration and development of off-flavors, or (b) development of stickiness these respective defects depending on the temperature used. Thus, at the higher temperature ranges, about 200–212° F., cooking above curve CD leads to stickiness so that long conditioning times are required and subdivision without cell rupture is difficult to accomplish. At lower temperature ranges, about 175–195° F., cooking above curve CD leads to discoloration (browning) and development of unnatural, undesirable flavors.

Generally it is preferred to carry out the cooking at a temperature of about 190° F. for the reason that at this temperature there is greater leeway than at higher temperatures between minimum and maximum cooking times. Thereby the process can be more accurately controlled and variations due to differences in composition of different batches of potatoes, localized or temporary temperature changes in the cooking medium, and the like, are canceled or at least minimized. Also, at the lower temperature range, 175–190° F., the thickness of the potato slices which are to be cooked is immaterial, and can be as much as one or two inches, or moderate-sized potatoes can even be cooked whole, without appreciable non-uniformity of cooking through the material. At higher cooking temperature it becomes more important that slice thickness or piece size be small enough to avoid non-uniformity of cooking whereby the center of the piece or slice is undercooked while the surface is overcooked, with resultant loss of the beneficial effects of the new cooking procedure. Thus at the highest cooking temperatures, about 205 to 212° F., it is preferred to use slices up to and including about one-half inch, or other pieces with similar ratio of surface area to volume, for example, dice up to and including once inch on a side.

The cooking, carried out under the conditions of time and temperature as explained above, is generally effected by immersing the potato slices in a bath of water at the selected temperatures. Another plan is to subject the potato slices to a current of steam or other hot gases. For cooking at temperatures below 212° F., mixtures of steam and air proportioned to provide the selected temperature, are useful.

It is to be noted that in the method of the present invention, the raw potatoes are given a single cook at prescribed conditions of time and temperature. This procedure is in contrast with methods which have been previously advocated wherein the potatoes are given a precook at relatively low temperatures followed by a cook at boiling temperatures.

The potatoes, cooked in accordance with the invention, may be subsequently treated by any of various processes which lead to the production of dried potatoes in particulate form. Regardless of the type of product eventually produced, the advantages outlined above will be realized. As examples, the cooked potatoes are mashed and then treated by known procedures to produce dried flakes or granules. Techniques for converting mashed potatoes into such products are well known in the art and any of the procedures may be employed. Techniques for producing granules are disclosed, for example, by Neel et al., Food Technology, vol. VIII, pp. 230–234, 1954, and processes of producing flakes by Willard et al., U.S. Patent 2,780,552.

A preferred technique of converting the potatoes, cooked in accordance with the invention, into dried granules without necessity for "add-back" is disclosed below. A principal feature in this procedure is that subdivision is accomplished by subjecting the potato material to repeated mild compression and mild shear forces while at the same time removing moisture from it. That is, the intensity of the mechanical forces are so controlled as to achieve effective separation of one cell from another rather than rupture of individual cells. As a net result, the potato material is formed into fine particles so that the end product will reconstitute rapidly and directly forming mashed potatoes free from lumpy or gritty particles. Further, because cell rupture is kept at a minimum, the reconstituted product is free from pastiness. In preparing granules without add-back, this improved method of subdivision is preferably applied after the potatoes have been subjected to a series of steps usually including cooking, mashing, and partial drying. The subdivision step may be performed as a separate step or as part of other steps in the sequence of operations. Thus, for example, the potatoes may be cooked, mashed, partially dried, conditioned by known methods, subdivided in accordance with the invention, and finally dried. More preferably, the conditioning step is carried out while also applying the subdivision treatment. In this way the time of conditioning is substantially reduced and the potato material is more readily reduced to fine, non-coherent particles. Another preferred plan is to apply the subdivision treatment during the final drying stage as well as in an earlier stage. This has the benefit that the final product is in especially fine particle size and exhibits a high density—very important in reducing packaging costs of the final product. It is evident from the above that where the subdivision step is applied in conjunction with another treatment, for example, conditioning or drying, it loses its identity as a separate, individual step. This, of course, does not belie the significance of the subdivision.

For a complete understanding of how the principles of the invention are applied in practice, the following detailed description is provided:

Referring to FIG. 1 in the annexed drawing, in stage 1 the raw potatoes are subjected to the usual preliminary steps of washing, peeling, trimming, and slicing. The tubers are cut into slices which may range about from one-eighth to one inch in thickness. To preserve flavor and color, it is preferred to dip the slices in a sulphite solution prior to further treatment. Usually an aqueous solution containing about from 0.5 to 1.25% of sodium sulphite or bisulphite is used and the slices dipped therein for a few minutes. For example, slices a quarter inch thick are dipped one minute in a 0.5% sulphite solution while slices three-fourths inch thick are dipped five minutes in a 1.25% sulphite solution. Usually the conditions of dipping are adjusted so that the slices contain about from 200 to 500 parts per million (p.p.m.) of $SO_2$ on a dry basis. Sulphiting may be applied at this stage as just described, but as an alternative it may be applied at a later stage, for example, after cooking and mashing. Another alternative is to apply part of the sulphite as described above and a further amount after cooking and mashing. Another alternative is to apply all or part of the sulphite by adding sulphur dioxide to the air or other gaseous medium applied to the potatoes during such steps as conditioning, granulating, drying, etc. Also, all or part of the sulphite may be applied in the soaking step described below.

An advantageous procedure which may be applied to the raw potato slices is to soak them in water to increase their moisture content. This has the desirable effect that the dehydrated products produced therefrom display an abiilty to absorb more water on reconstitution than otherwise would be the case. The procedure employed simply involves soaking the raw slices in water until their weight increases about 10% by absorption of water. Depending on such factors as piece size, variety of potato, etc., the soaking to attain this effect may require anywhere from one to four hours. The soaking step if employed is a useful point at which to impregnate the potato tissue with sulphite. Hence, the water may contain a small proportion, say 0.02 to 0.1% of sodium sulphite or bisulphite. This sulphiting procedure may be used instead of, or in conjunction with, sulphiting at other stages in the process.

In stage 2, the potato slices are cooked under controlled conditions of time and temperature as described above.

In stage 3, the cooked potatoes—while hot—are mashed in conventional manner. This operation may be carried out by pressing the cooked potatoes between warm rolls, by pressing them through a screen, or by other conventional potato-mashing techniques. During or after mashing, various additives may be incorporated into the mash. Thus, to preserve color and flavor, a minor proportion of sodium sulphite or bisulphite may be added. Generally, enough sulphite is added to provide about 200 to 500 p.p.m. of $SO_2$ on a dry basis, including that incorporated in the previous sulphite dipping step or other sulphiting operation, where such are used. Minor proportions of fat-stabilizing antioxidants such as nordihydro guairetic acid, butylated hydroxy anisole, butylated hydroxy toluene, etc., may be added to prevent rancidification of the natural fat in the product on storage. To increase ability of the product to absorb moisture and to reduce stickiness, edible dispersing agents such as the monoglyceryl esters of long-chain fatty acids may be incorporated in the mash. Other substances which may be added are such food ingredients as salt, whole milk solids, non-fat milk solids, etc.

In stage 4, the mashed potatoes are partially dehydrated. This may be conveniently done with a double-drum drier. The mashed potatoes are fed into the nip between rotating, heated drums and the partially dried potato material is removed by scraper blades. The drier drums are generally heated to a temperature in the range about from 150 to 300° F. The temperature of the drums, the speed of rotation, and the thickness of the film of potato material are so correlated that the partially dried potato mash has a moisture content about from 50 to 75%, preferably about 60%. Although partial drying on heated drums is a preferred technique, it is not essential to use it. Thus other conventional dehydration procedures such as exposing thin layers or extruded portions of the mash to a current of hot air, vacuum dehydration techniques, and so forth, can be employed.

Following partial drying, the potato material in stage 5 is subjected to cooling and conditioning to eliminate its doughy texture and make it friable. In this stage the temperature of the mash is reduced to temperatures ranging from about 100° F. down to subfreezing temperatures. The conditioning may be effected in various ways. For example, the potato material may be held without mixing in closed containers in the presence of adventitious air or in the absence of air, that is, under vacuum or in an atmosphere of an inert gas such as nitrogen. Where the conditioning is at temperatures above freezing, the mash may be subjected to occasional or periodic fluffing or mixing during conditioning to minimize formation of aggregated masses that would subsequently be difficult to separate without rupture of cells. Thus, for instance, the potato mash may be carried on an elongated conveyor belt while it is subjected to the action of rotating paddles or similar devices which exert a gentle mixing or fluffing action to effect separation of the mass without rupture of individual cells. During the conditioning, the mash may be contacted with a current of air or an inert gas such as nitrogen to cool the product to temperatures from about 100° F. down to about 30° F. if conditioning is above freezing, or to freeze the product if conditioning is brought about by freezing. A minor proportion of sulphur dioxide may be added to the gas stream, particularly in the event that in previous steps the usual amount of sulfite is not added to the mash. In the preferred modification the conditioning is carried out by applying to the mash occasional or periodic mixing or fluffing while simultaneously contacting it with a stream of air. Under these conditions, and especially when the potatoes are cooked in the special way described above, the conditioning above freezing temperatures is completed in a maximum of three hours and in many cases in one to two hours. More frequent mixing or fluffing is required when the mash is being cooled than at other times during the conditioning, because the hardening of the mass is accelerated by the evaporation of moisture from the product during cooling. The mixing or fluffing is a form of the mild compressive-mild shear action. It is important that the compressive portion of the forces be especially mild in the early stages of conditioning. Otherwise, the material, which is somewhat cohesive in these early stages, will be agglomerated by the action, rather than separated, and longer time will be required for the material to become friable.

In stage 6, the conditioned material is granulated and dried through the critical moisture range. The granulation and drying are carried out either simultaneously or in closely successive operations repeated a number of times. (Where conditioning is carried out at subfreezing temperature, the mash is thawed before granulating.) In this granulating step the aim is to subdivide the mash into particles containing not more than about ten individual cells, preferably unicellular particles, and it must be done by separating one cell from one another rather than by rupturing individual cells. Were the latter to be done the product would yield a pasty, unpalatable mass on reconstitution. The granulation can be successfully accomplished by applying to the mass repeated mild compression and mild shear forces. Preferred methods by which this end can be attained are explained below in connection with FIGS. 2, 3, and 5. Any coarse potato material present after granulation may be recycled back to the conditioning step (stage 5).

In stage 7, the granulated potato material is further dehydrated to produce the dried granules. This final dehydration may be carried out in any manner as is conventional in the art. As an example, the potato material may be dehydrated by procedures incorporating the principle of fluidization. To this end, the potato material is placed in a vessel provided with means for jetting minute streams of hot air up through the bed of material tending to keep it in a fluidized state while being dried. Apparatus of this type and method of employing it to dehydrate moist potato particles are disclosed by Neel et al. (Food Technology, 1954, vol. VIII, pp. 230–234.) To further promote fluidization of the product in the early part of this drying operation, this fluidized-bed drier can be subjected to continuous vibration or shaking, or a mechanical agitator can be employed. In the alternative, the granulated potato material may be dehydrated in pneumatic-type driers, for instance, a device of the type disclosed by Olson et al. in Food Technology, vol. VII, pp. 177–181 (1953). This device consists essentially of a long, vertically positioned duct. Hot air at about 212–392° F. is forced upwardly at high velocity (i.e., about 1000 ft./min.) through the duct and the friable granulated potato material is fed into this air stream. As the current of air carries the material upward it is dehydrated. At the top of the duct is a conically diverging diffuser so that as the current rises into the diffuser its velocity is gradually diminished. A deflector is positioned above the diffuser whereby the now slowly moving current is deflected downward causing the dried potato granules to drop out of the air stream so that they can easily be separated from the moist exhaust air. In a preferred method, the final dehydration is accomplished while the potato material is subjected to repeated mild compression and mild shear forces, as described below in connection with FIG. 4. In any event, after final drying the product has a moisture content of about 5 to 8%, preferably about 6%.

Reference is now made to FIGS. 2 and 3 which illustrate one modification of apparatus for effecting the granulation and drying through the critical moisture zone. The apparatus, generally designated at 20, comprises a trough or U-shaped chamber 22 provided with a removable lid 23 and a longitudinal shaft 24. Suitable equipment, not illustrated, is provided to rotate shaft 24 in the direction shown at a low speed—about 1 to 5 r.p.m. Attached to shaft 24 are a series of arms 25, each bearing a paddle 26. Dimensions are so chosen that the tips of paddles 26 have a clearance on the order of one-fourth to one-half inch from the cylindrical base of trough 22. Also positioned on shaft 24 are arms 27 which carry a blade 28 which extends essentially the length of trough 22. Blade 28 is made of flexible material such as silicone rubber (Silastic), neoprene, Teflon or other elastomer and is so positioned that its edge actually wipes against the cylindrical base of trough 22. This base may be provided with small protuberances, as by welding wires longitudinally along it, to increase the shearing effect to the desired level. An inlet conduit 29 is provided for introduction of gaseous media, for example, air for drying.

In using the illustrated device to granulate the potato material, conditioned potato mash—produced as above described—is introduced into trough 22. Shaft 24 is then caused to rotate and drying air is introduced through inlet conduit 29. The resulting action of paddles 26 and blade 28 effect the granulation of the potato material. Thus, paddles 26 cause a repeated mixing of the material and a disintegration of the larger aggregates of cells. Blade 28 being actually in contact with the cylindrical base of trough 22 effects a further size reduction of the particles. The reduction in particle size effected by the device is essentially limited to separation of individual cells one from another as contrasted with rupture of individual cells. Important in this regard is the fact that paddles 26 and blade 28 exert what may best be termed as mild compression and mild shear forces. Thus the mechanical forces exerted by these elements are of sufficient intensity to separate agglomerated cells but insufficient to rupture individual cells. The action is continued until the potato material forms a well-granulated mass of unicellular particles and small aggregates of unicellular particles that have only a very slight tendency to agglomerate together. Any agglomerates formed are very readily separated from one another. This is at the lower end of the critical moisture region where the potato material contains about 32 to 45% water, the precise moisture value depending somewhat on the previous history of the material. During the granulation, the potato material is contacted with a current of air, for example, at a temperature about from 75 to 200° F., to cause the desired reduction in moisture content during granulation. Ordinarily, the product remains at room temperature (about 75° F.) during the granulation. The warm air introduced does not appreciably raise the temperature of the potato material because of the cooling effect as water is evaporated therefrom.

Moreover, our researches have shown that there is an important relationship between the properties of the potato material, as regards granulation, and its moisture content. Knowledge of this relationship permits us to obtain significant advantages in the production of potato granules. It has been found that the granulation is most effectively accomplished while the moisture content of the potato material is reduced from about 50% down to about 35%, this range being herein designated as the critical moisture range. Thus, our researches have indicated that if the granulation is applied only at higher moisture levels (that is, above about 50%) the product retains so much cohesiveness that the particles will re-aggregate when subjected to subsequent operations. On the other hand, if the granulation is not effected until the moisture content of the mash is reduced to below 35%, the potato material is so horny that it cannot be subdivided without cell rupture. However, where the granulation is conducted while repeatedly applying the mild compression and mild shear forces and simultaneously contacting the mash with a draft of drying gas, this treatment being continued while the moisture content of the mash passes through the range from about 50% moisture down to about 35% moisture, the potato material is effectively granulated without cell rupture and the granulated product displays a minimum tendency to cohere in subsequent operations. In operating under this system, it is evident that there is at least a partial merging of stages 6 and 7 because in both of these stages there is granulation as well as drying.

The apparatus illustrated in FIGS. 2 and 3 can be employed for drying the granulated potato material. Indeed, this is a preferred method as it permits reducing the moisture content through the critical zone mentioned above while simultaneously subjecting it to granulation with mild compression and mild shear forces. To this end the granulator 20 is connected to a product-collection system as shown in FIG. 4. Referring to this figure, the exit conduit 30 is connected to collector 21. In operation, the dried product is carried by the current of air out of trough 22 into collector 21, the product dropping through discharge port 31 and excess drying air being released through vent 32. In drying in this way, the amount and temperature of the air introduced into the system via conduit 29 are increased above the levels used in the preceding stage. Thus, for example, the air temperature used is about from 150 to 250° F. The velocity of the air is increased so that the current is strong enough to carry out from trough 22 the fine dry particles. During the drying cycle, shaft 24 is rotated, as during the granulation, to maintain the potato material in a loose and bulky state and subdivide any larger particles found by re-aggregation of finer ones. During operation, the particles discharged from pipe 31 are examined and the velocity of the air stream adjusted so that essentially only the properly-dried, fine particles are carried by the air stream into the collector and the aggregated particles remain in chamber 22 for further drying and subdividing.

It is further evident that granulation and drying need not necessarily be carried out as separate and distinct steps. Thus, for example, the conditioned potato material may be introduced into trough 22 and shaft 24 started to rotate, this being continued throughout the process. At first, air at about room temperature is introduced into the system through conduit 29. Then as the operation continues the air temperature is gradually increased up to suitable temperatures for drying. Likewise, during the later stage of the process, the velocity of the air stream is likewise increased to entrain the dried fine particles and carry them out of the trough. Moreover, the trough granulator may be used for all three stages—conditioning, granulation, and drying. Thus, for example, the partially-dried hot mash is introduced into trough 22 and shaft 24 rotated either continuously or at intervals until the mash loses its doughy texture and becomes more friable. During conditioning, cooling may be applied as by contacting the mash with air at room temperature or below. After the potato material begins to lose its doughy texture, the shaft is rotated continuously, this being continued throughout the process, while the air temperature is gradually increased up to suitable temperatures for drying. Thereby the product is subjected to granulation and drying. Eventually, the velocity of the air stream is increased to entrain the fine dry particles and carry them out of the trough into the collector system.

In FIG. 5 is illustrated an alternative form of apparatus which may advantageously be utilized in the conditioning, granulating and drying steps. This apparatus includes a rectangular frame 35, supporting a screen 36. This screen is of fine mesh construction (80- to 150-mesh, for instance) to allow air to flow through but to prevent the potato material from passing through it. Frame 35 is connected to vibrator 37, of conventional construction, to vibrate the device. Journaled on frame 35 are a series of shafts 38 rotated in the direction shown by suitable equipment at moderate speed (about 50 to 150 r.p.m.). Secured to shafts 38 are arms 25 and 27, bearing paddles 26 and blades 28, as described in the modification of FIGS. 2 and 3. As in that modification, paddles 26 clear screen 36 by a distance of about one-eighth to one-fourth inch whereas the soft, flexible, elastic blades 28 actually contact the screen. In using the device the potato material is placed on the screen 36 at the upper (right-hand) end and shafts 38 are rotated while the frame is vibrated. In small-scale construction the material arriving at the lower end of the screen may be collected and replaced at the higher end for continued action. On a larger scale the dimensions and the number of shafts and associated mechanisms are selected to properly treat the material in a single pass. The device, as that of FIGS. 2 and 3, may be employed in any of the stages of conditioning, granulating, drying, or any combination of them. Air for decreasing the moisture content of the potato material during treatment is forced upwardly through duct 39, connected to frame 35 via flexible coupling 40. Where the system is used for producing a dry product, a hood and collector of conventional design may be positioned above frame 35 for collecting the dried product.

As has been noted briefly above, the present invention may advantageously be applied in the manufacture of potato granules by the add-back process whereby to obtain significant advantages including (1) elimination or at least marked reduction in time of conditioning, (2) reduction in amount of "seed" which needs to be recycled and (3) reduction in stickiness of the final product on reconstitution. Thus advantages result from the fact that with the new cooking procedure there is (1) substantially improved granulability of partially dried potatoes, and (2) much improvement in texture of the final product. In applying the invention to the add-back process, potatoes are subjected to the preliminary steps (stage 1) and to the new cooking procedure (stage 2) as described above. The cooked potatoes are then mashed and mixed with sufficient "seed" granules (that is, dried granules from a previous batch) to form a composite having a moisture content of about 32 to 35%. This composite material is then cooled to about room temperature, preferably while applying repeated mild compression and mild shear forces as described above, using the granulator device of FIGS. 2 and 3 or that of FIG. 5. The material can then be dried directly—no conditioning step is required as in previous practice. Thus in conventional practice the composite (freshly mashed potatoes plus seed granules) must be conditioned at room temperature for at least an hour. In an alternative method, the present invention may be used in the manufacture of potato granules by the add-back process to obtain a product of very fine texture (unusually low blue value), again without conditioning of the material before drying. (Elimination of the conditioning period is important as there is then much less opportunity for quality changes, by oxidation or other deteriorative reactions.) In applying this process the potatoes are treated as above described—preliminary steps (stage 1), special cooking (stage 2), mashing (stage 3), and partial-drying (stage 4), then mixed with sufficient "seed" granules to give a moisture content of 30 to 40% for composite material. The composite material is mixed and cooled to room temperature, preferably while applying repeated mild compression and mild shear forces as described above, using the granulator device of FIGS. 2 and 3 or that of FIG. 5. The material is then directly dried—no conditioning period is needed.

The invention is further demonstrated by the following illustrative examples.

In the examples, products were tested for blue value index by the method of Mullins et al. (Food Technology, vol. 9, p. 393) on a basis of 2½ grams of dry solids. This determination furnishes a measure of release of free starch from the cells and a higher value denotes more free starch. In another test, moisture absorption of the products was measured by a modification of the method of Potter (Jour. Ag. and Food Chem., vol. 2, p. 516; 1954). This test determines the volume of reconstituted mashed potatoes formed per unit weight of dried granules. In this case a higher value indicates a superior product as more mashed potatoes are formed from a standard amount of dry material.

*Example I*

Idaho Russet Burbank potatoes were washed, peeled, trimmed, and cut in three-fourths inch thick slices.

The slices were dipped five minutes in a 1.25% aqueous solution of sodium bisulphite. The slices were then cooked 60 minutes in a mixture of air and steam having a temperature of 190° F.

The cooked potatoes were mashed by pressing through a one-half inch mesh screen, then blended in a planetary-type mixer for one minute with 10% of their weight of water containing 0.6 gram of sodium bisulphite per ten pounds of potatoes.

The potato mash was then partially dried on a single drum drier—drum temperature 250° F., speed of drum 2.5 r.p.m. The partially-dried mash had a moisture content of 56.5%.

The partially-dried mash was then conditioned. To this end, it was placed in a trough granulator as depicted in FIGS. 2 and 3. The shaft was rotated (2 r.p.m.) continuously during addition of the mash (30 minutes), then for the next hour the shaft was rotated five minutes out of each 15-minute period. During this operation the temperature of the mash decreased from about 125° F. to about 65° F. The mash was then friable and ready for the beginning of granulation. It was near the upper limit of the critical moisture region referred to above.

To granulate the conditioned mash, it was left in the trough granulator and the shaft was operated continuously (2 r.p.m.) for one hour while air at room temperature was blown through the device. Moisture content of the material was reduced to 50.5%. The material was near the middle of its critical moisture region. It was now granulated well enough that the rate of drying could be increased without resulting in an excessive proportion of coarse dried product.

The potato material—still in the trough granulator and with the collector attached as in FIG. 4—was subjected to a current of air at 200° F. while the speed of the shaft was increased to 5 r.p.m. In about 30 minutes, 94% of the dried granules were received in the collector. This product containing 20% moisture was then finish-dried in a fluidized bed drier to produce granules of 6% moisture content. The product had a blue value index of 17, indicative of very slight cell damage. Bulk density of the product was 0.92 gram/cc.; moisture absorption was 5.7 cc. of reconstituted mash per gram of product. A portion of the product on reconstitution with boiling water formed mashed potatoes of a desirable mealy texture free from both pastiness and graininess.

*Example II*

A quantity of Idaho Russet Burbank potatoes was washed, peeled, trimmed, sliced, and given a 5-minute dip in 1.25% aqueous sodium bisulphite solution. The material was then divided into several lots which were cooked under different time and temperature conditions set forth below. For comparison, several lots were cooked under conditions outside the scope of the invention; these included lots A1, A4, A5, and C1.

Following cooking, each lot was converted into granules by the same method. This method involved these steps:

The cooked potatoes were mashed by pressing through a one-half inch mesh screen, then blended in a planetary-type mixer for one minute with 10% of their weight of water containing 0.6 gram of sodium bisulphite solution per ten pounds of potatoes.

The potato mash was then partially dried on a single drum drier—drum temperature 250° F., speed of drum 3.5 r.p.m. The partially-dried mash had a moisture content of about 55%.

The partially-dried mash was then conditioned. To this end, it was placed in a trough granulator as depicted in FIGS. 2 and 3. The shaft was rotated (2 r.p.m.) continuously during addition of the mash (30 minutes) then the shaft was rotated five minutes out of each 20-minute period. In about 90 minutes the temperature of the mash decreased from about 125° F. to about 65° F. The conditioning was continued until the potato material lost its doughy texture and became friable. The time required for this result varied with the different lots as indicated in the table below.

To granulate the conditioned mash, it was left in the trough granulator and the shaft was operated continuously for one hour while air at room temperature was blown through the device. Moisture content of the material was reduced to about 50%.

The potato material—still in the trough granulator and with the collector attached as in FIG. 4—was subjected to a current of air at 200° F. while the speed of the shaft was increased to 5 r.p.m. The product received in the collector, containing about 20% moisture, was finish-dried in a fluidized bed drier to produce granules of about 6% moisture content.

The conditions used and the results obtained are tabulated below:

The slices were dipped five minutes in a 1.25% aqueous solution of sodium bisulphite. The slices were then cooked for 90 minutes in a mixture of steam and air having a temperature of 185° F.

The cooked slices were mashed and mixed with 10% of their weight of water containing 0.6 g. of sodium bisulphite per ten pounds potatoes and with seed granules using six pounds seed to three pounds cooked potatoes. (In the first run, the seed was commercial potato granules; in subsequent runs, the seed was granules from the next previous run.) The mixing was done in a planetary-type food mixer and in ten minutes the temperature of the mix was about 110° F. Air was blown into the mixer for five minutes longer, at which time the mix was cooled to about 75–80° F. Mixing was then discontinued.

The cooled composite was then dried in a pneumatic (air-lift) drier using a current of air at 260° F.

The dried material was screened through an 8-mesh screen, the coarse material retained on the screen being weighed and discarded as "scalping loss." The fine material was then put through a 60-mesh screen, the material on this screen being reserved as seed for the next cycle, the material passing through the screen being the granule product.

The process as described above was repeated some 15 times, each representing a cycle. It may be noted that it requires about ten cycles to produce representative results, that is, elimination of the effect of the seed originally used.

For control purposes, the same procedure was applied except that the cooking conditions were conventional. Thus the potato slices, in this case three-fourths inch thick, were cooked in steam (212° F.) for 25 minutes.

| Lot | Size of raw potatoes, Inches | Cooking temp., ° F. | Cooking time, Min. | Conditioning time required, Hrs. | Blue value index of granules | Texture on reconstitution with water at 170° F. | Texture on reconstitution with water at 212° F. |
|---|---|---|---|---|---|---|---|
| A-1 | ½ x ½ x ½ | 212 (steam) | 3 | 5 | 104 | Good | Pasty. |
| A-2 | ½ x ½ x ½ | do | 7 | 3 | 49 | Excellent | Excellent. |
| A-3 | ½ x ½ x ½ | do | 9 | 3 | 59 | do | Do. |
| A-4 | ½ x ½ x ½ | do | 15 | 4 | 93 | Good | Pasty. |
| A-5 | ½ x ½ x ½ | do | 25 | 4 | 155 | Pasty | Do. |
| B | ½ (slices) | 200 (steam and air) | 20 | 2.5 | 45 | Excellent | Excellent. |
| C-1 | ¾ (slices) | 190 (steam and air) | 25 | 7 | 82 | Good | Pasty. |
| C-2 | do | do | 60 | 2 | 17 | Excellent | Excellent. |
| C-3 | do | do | 150 | 2 | 32 | do | Do. |

*Example III*

Raw potatoes were cut into three-fourths inch slices and cooked in a steam-air mixture at 190° F. for various times as described below. Each batch of cooked potatoes was then separately dried using the following technique. The cooked potatoes were mashed, frozen and while frozen extruded through rolls spaced apart 0.01 inch to produce platelets having essentially monocellular thickness. This product was put on trays and dried in a current of air at 120° F.

The various dried products were then subjected to certain tests. In one test, the products were reconstituted with boiling water, 90 cc. per 20 g. product, and the resulting mashed potatoes were rated for texture, color and flavor by a panel of skilled food tasters.

The results are tabulated below:

| Cooking Time, Min. | Properties of Reconstituted Product |
|---|---|
| 15 | Contained uncooked lumps; typical flavor and color. |
| 60 | No uncooked lumps; typical flavor and color. |
| 90 | Do. |
| 240 | No uncooked lumps; brownish discoloration and off-flavor. |

*Example IV*

Idaho Russet Burbank potatoes were washed, peeled and cut into one-half inch slices.

The results obtained are tabulated below:

| Cycle Number | A — With New Cooking Method 185° F., 90 Min. | | B — With Regular Cooking 212° F., 25 Min. | |
|---|---|---|---|---|
| | Blue Value of Product | Scalping Loss, Percent | Blue Value of Product | Scalping Loss, Percent |
| Seed (Commercial granules) | 78 | | 78 | |
| 2 | 70 | 24 | 76 | 7 |
| 4 | 65 | 31 | 89 | 7 |
| 6 | 64 | 13 | 89 | 14 |
| 8 | 64 | 9 | 92 | 24 |
| 10 | 62 | 7 | 117 | 34 |
| 12 | 59 | 6 | 124 | 36 |
| 14 | 59 | 14 | | |
| 15 | 59 | 9 | | |

The steady improvement in blue value and scalping loss in run A (with the new cooking method) as contrasted with the steady deterioration of quality in run B (regular cooking) demonstrates the improvement obtained with the new cooking method.

*Example V*

Idaho Russet Burbank potatoes were washed, peeled, trimmed and cut into three-fourth inch slices.

The slices were dipped five minutes in a 1.25% sodium bisulphite solution. The slices were then cooked for 60 minutes in water at 190° F.

The cooked slices were mashed and blended with 10% of their weight of water containing 0.6 g. of sodium bisulphite per ten pounds of potatoes. The mash was partially dehydrated on a double-drum drier—drum temperature 200° F., speed of drums 1 r.p.m., clearance between drums 0.015". The partially dried mash had a moisture content of 75%.

The partially dried mash was then mixed with seed granules (3# mash, 4# seed) using commercial granules for the first cycle and material from a previous run for the next succeeding cycles. The mixing was in a planetary-type food mixer for 15 minutes. The material was then dried on the vibrating screen drier shown in FIG. 5 with parts 27, 28 removed. Air at 190° F. was blown up through screen 36. The product was dried to about 12% moisture content.

The dried granules were then put through 8-mesh and 60-mesh screens as described in Example IV.

The results are tabulated below:

| Cycle Number | Blue Value of Granules |
|---|---|
| Seed (Commercial granules) | 78 |
| 4 | 62 |
| 6 | 58 |
| 8 | 40 |
| 10 | 39 |
| 12 | 31 |

Having thus described the invention, what is claimed is:

1. The method of preparing dehydrated potatoes which comprises subjecting raw potato slices to a single cooking operation at temperature and time conditions within the area ABDC in FIG. 6, mashing the potatoes while hot and subjecting them to dehydrating conditions to produce dehydrated potatoes.

2. The method of preparing dehydrated potatoes which comprises subjecting raw potato slices to a single cooking operation at a temperature of about 190° F. for about 60 minutes, directly mashing the cooked potatoes and subjecting them to dehydrating conditions to produce dehydrated potatoes.

3. The method of preparing dehydrated potatoes which comprises subjecting raw potato slices to a single cooking operation at a temperature of about 190° F. for a period of about 60 minutes, directly mashing the hot cooked potatoes, subdividing the mash into particles and dehydrating it to produce dehydrated potatoes in particulate form.

4. The method of preparing dehydrated potatoes which comprises subjecting raw potato slices to a single cooking operation at a temperature of about 190° F. for about 60 minutes, directly mashing the cooked potatoes, successively subjecting the mash to partial drying, conditioning, granulating, and final drying to produce dehydrated potatoes in dry granule form.

References Cited in the file of this patent

UNITED STATES PATENTS

| | | |
|---|---|---|
| 2,780,552 | Willard | Feb. 5, 1957 |
| 2,787,553 | Cording | Apr. 2, 1957 |

OTHER REFERENCES

Talburt and Smith: 1959, "Potato Processing," pp. 309–310.

Talburt: "Potato Processing," 1959, pp. 330–331.